United States Patent [19]

Nose et al.

[11] Patent Number: 5,172,093
[45] Date of Patent: Dec. 15, 1992

[54] ALARMING SYSTEM

[75] Inventors: Shinji Nose; Manabu Matsubara, both of Kobe, Japan

[73] Assignee: Fujitsu Ten Limited, Japan

[21] Appl. No.: 796,449

[22] Filed: Nov. 22, 1991

[30] Foreign Application Priority Data

Nov. 22, 1990 [JP] Japan ................................. 2-319827
Apr. 2, 1991 [JP] Japan ................................. 3-21066[U]

[51] Int. Cl.⁵ .............................................. G08B 13/04
[52] U.S. Cl. .................................... 340/426; 340/527; 340/529; 340/430; 340/550
[58] Field of Search ............... 340/426, 429, 566, 571, 340/430, 550, 527, 528, 529, 530

[56] References Cited

U.S. PATENT DOCUMENTS

| | | | |
|---|---|---|---|
| 4,030,087 | 6/1977 | Ritchie et al. | 340/571 |
| 5,084,697 | 1/1992 | Hwang | 340/529 |

FOREIGN PATENT DOCUMENTS

| | | |
|---|---|---|
| 61-14158 | 1/1986 | Japan . |
| 61-78065 | 5/1986 | Japan . |
| 61-150852 | 7/1986 | Japan . |
| 61-161477 | 7/1986 | Japan . |
| 61-171641 | 8/1986 | Japan . |
| 61-163767 | 10/1986 | Japan . |
| 62-46741 | 2/1987 | Japan . |
| 62-114853 | 7/1987 | Japan . |
| 62-143557 | 9/1987 | Japan . |
| 62-247945 | 10/1987 | Japan . |
| 62-189272 | 12/1987 | Japan . |
| 63-125458 | 5/1988 | Japan . |
| 63-129655 | 8/1988 | Japan . |
| 63-269757 | 11/1988 | Japan . |
| 64-16954 | 1/1989 | Japan . |
| 1-237900 | 9/1989 | Japan . |
| 2-41856 | 3/1990 | Japan . |
| 2-107550 | 8/1990 | Japan . |
| 2-132561 | 11/1990 | Japan . |

Primary Examiner—Glen R. Swann, III
Attorney, Agent, or Firm—Staas & Halsey

[57] ABSTRACT

In a glass smashing alarm system for generating an alarm when a glass smashing sound is detected, the present invention is directed to reduce the possibility of occurrence of an erroneous alarm, and includes a normal alarm mode in which a preliminary alarm is raised for a short time when a glass smashing sound is detected, and a special alarm mode in which a main alarm is raised for a long time when the glass smashing sound is detected, and is constituted in such a manner that mode switching is effected so as to shift the mode to the special alarm mode at the end of the preliminary alarm, and to return it to the normal alarm mode after the passage of a predetermined time if the glass smashing sound is not detected at the end of the main alarm or during the special alarming mode. In another aspect of the invention, generation of an alarm is inhibited if a key unlock switch is turned ON before passage of a predetermined time from detection of the glass smashing sound.

5 Claims, 7 Drawing Sheets

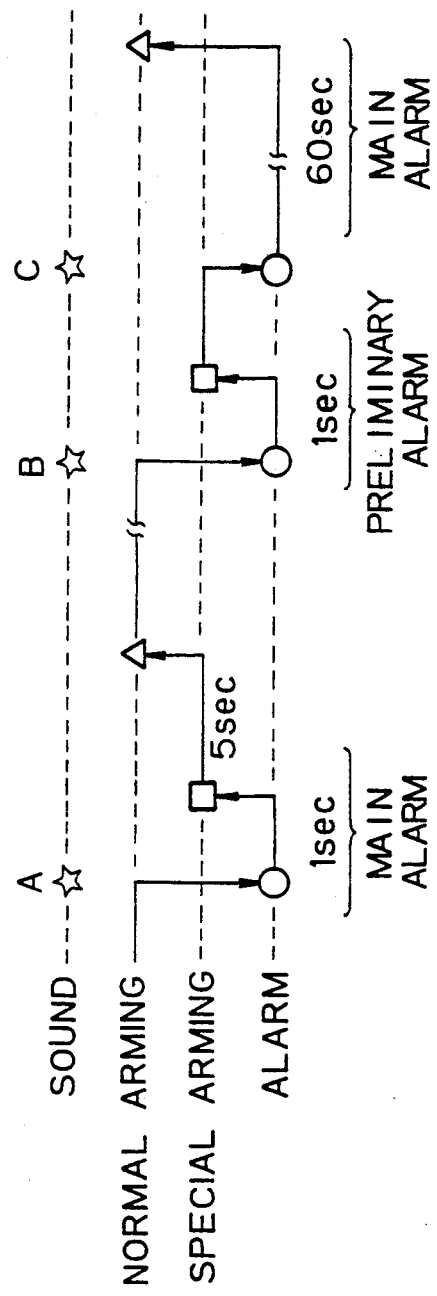

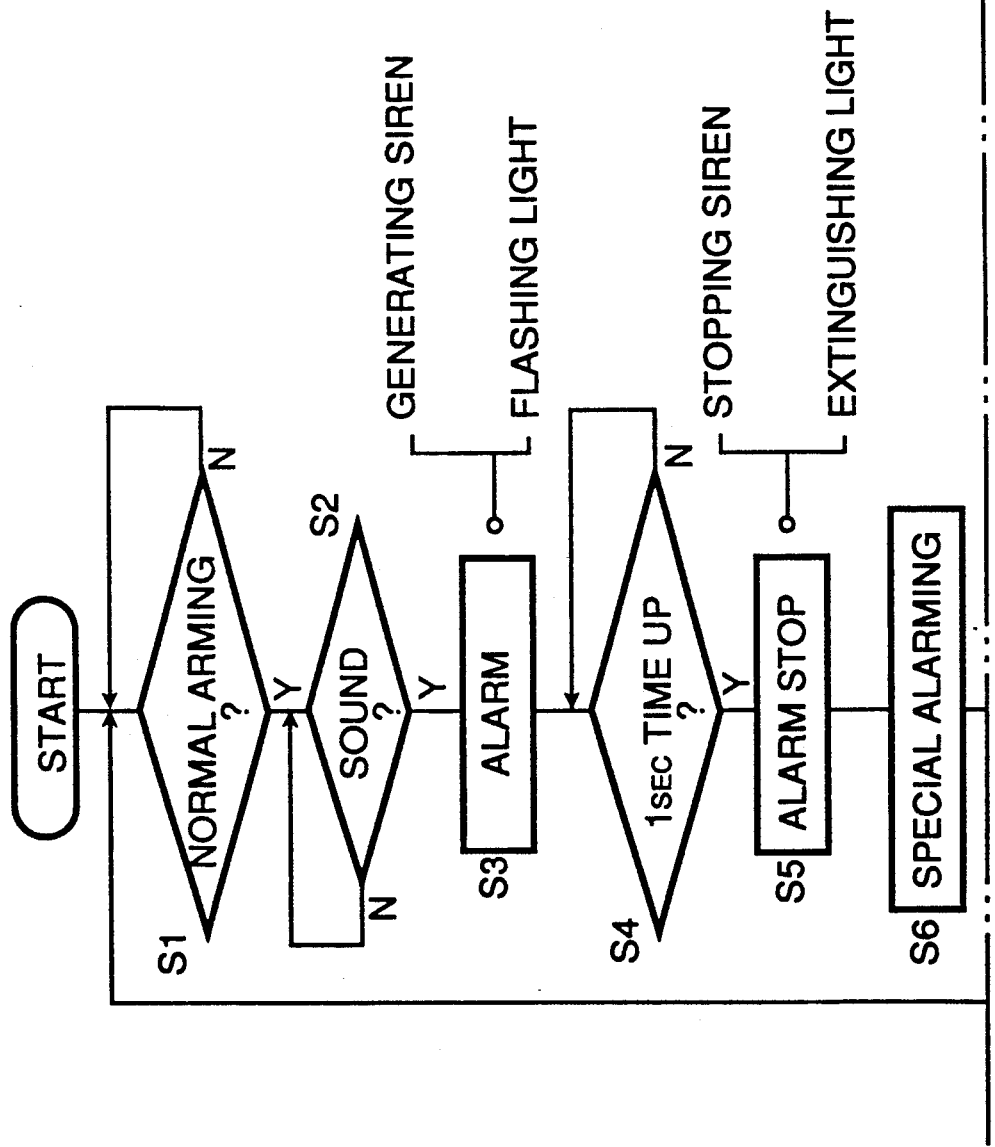

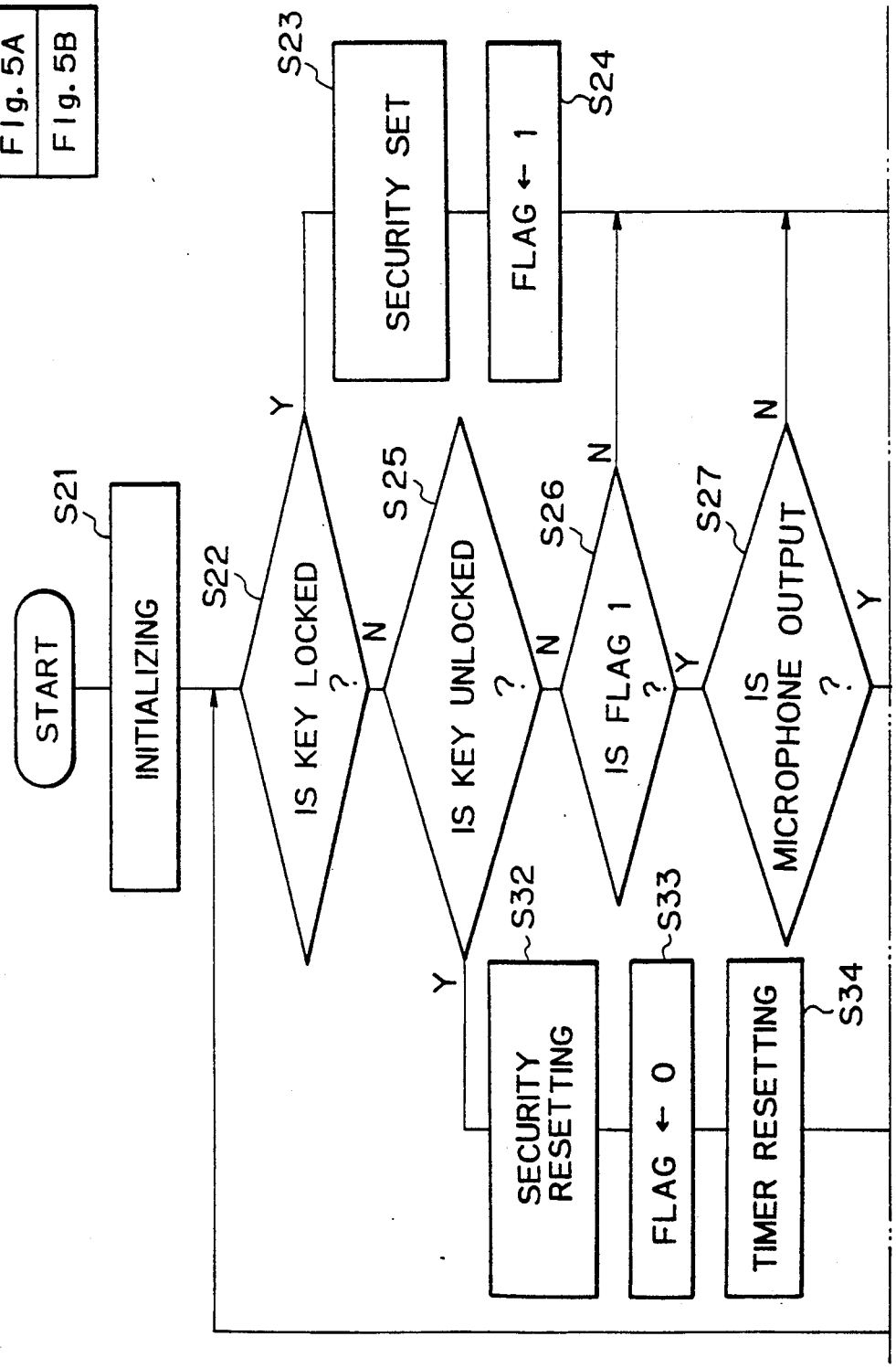

ALARMING SYSTEM

BACKGROUND OF THE INVENTION

1. Field of the Invention

This invention relates to an alarm system for detecting a sound and raising an alarm.

2. Description of the Related Art

Various alarm systems have been developed in order to prevent the burglary of automobiles and the invasion of an intruders. The detection means for detecting an alarm condition used in said alarm systems include ultrasonic waves, laser beams, heat sensors and the use of sound. According to the detection method using sound, when operations such as knocking, boring, breaking, rupturing, etc., windows, doors, walls, etc., occur, a sound having specific frequency components inherent to the materials is generated in accordance with the conditions of the material. Accordingly, it is possible to detect whether or not an alarm state occurs, by detecting and analyzing the resulting sound. For instance, an alarm system that stores, in advance, a glass smashing sound of a window pane of an automobile or a room and raises an alarm when the said sound is actually generated is known. This glass smashing alarm system has a construction wherein a microphone disposed internally picks up the frequency (e.g. 4.7 KHz) inherent to glass smashing, and said act is judged as occurring when this frequency is detected. This system is used as a burglar-proof system of automobiles, for example.

The glass smashing alarm system described above inadvertently operates, however, when a different sound having the same frequency components as that of glass smashing occurs. It also operates erroneously when vibration having a frequency close to that of the glass smashing sound is directly transmitted to an acoustic-electric convertor of the microphone. Such erroneous operations are likely to occur particularly when the microphone is disposed inside an instrument panel of the automobile.

The present invention is aimed at reducing the possibility of occurrence of an erroneous alarm operation by considering, in particular, the generation of an artificial glass smashing sound with the passage of time.

SUMMARY OF THE INVENTION

To accomplish the object described above, the present invention provides an alarm system having the following construction. In other words, the alarm system of the present invention includes a normal alarm mode in which a preliminary alarm is raised for a short time when an alarming sound is detected and a special alarm mode in which a main alarm is raised for a long time when the alarming sound is detected, and mode switching is effected in such a manner as to shift the operation mode to the special alarm mode at the end of the preliminary alarm, and to return the operation mode to the normal alarm mode at the end of the main alarm or after the passage of a predetermined time without any detection of the alarming sound in the special alarm mode.

If the special alarm mode for raising the main alarm for a long time in the present invention is regarded as the conventional alarm mode, the operation mode cannot be shifted to this special alarm mode unless the alarming sound is once detected in the normal alarm mode as a preliminary stage. Moreover, since the operation mode is returned to the normal alarm mode unless the alarming sound is detected within a predetermined time after the shift to the special alarm mode, the main alarm is not eventually raised in most cases if false sounds are sporadically generated, although the main alarm is raised when the glass smashing sound, as one of the alarming sounds, is generated many times when a window pane is smashed at the time of a burglary. Accordingly, the probability of the generation of an erroneous alarm can be reduced.

If the alarming sound is detected in the normal alarm mode, the operation mode may merely shift to the special alarm mode but in the present invention, the preliminary alarm is generated for a short time. The preliminary alarm has the function of warning so as to encourage the burglar to cease the burglary at the initial stage when the window pane is first broken. If the intruder continues to smash the window pane irrespective of this preliminary alarm, the main alarm described above is raised because the possibility of the occurrence of a burglary is extremely high.

BRIEF DESCRIPTION OF THE DRAWINGS

FIG. 3 illustrates the proper relative orientation of FIGS. 3A and 3B;

FIGS. 3A and 3B comprises a flowchart of the burglar-proof system of the present invention;

FIG. 5 illustrates the proper relative orientation of FIGS. 5A and 5B; and

FIGS. 5A and 5B comprises a flowchart for practicing the embodiment shown in FIG. 4.

DESCRIPTION OF THE PREFERRED EMBODIMENTS

In a burglar-proof system of the invention to be hereinafter described, a glass smashing sound will be employed as a sound causing alarm and the system of the invention will be constituted as a burglar-proof system for automobiles, by way of example. However, the present invention is not particularly limited thereto, as already described.

Figure 1:
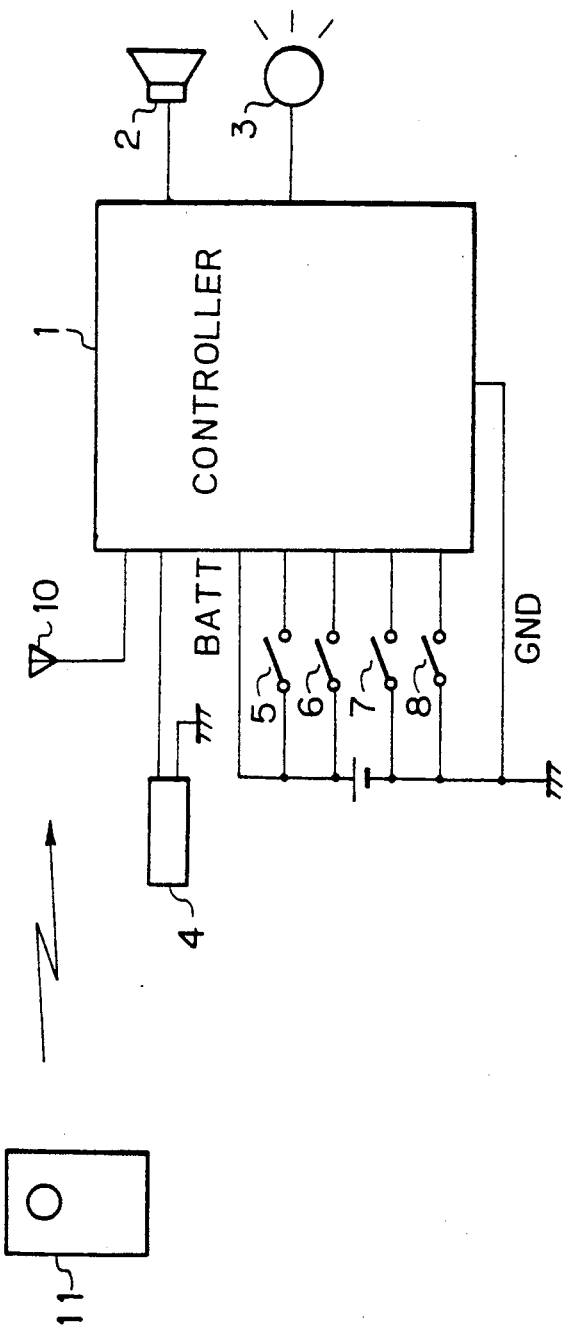
FIG. 1 is a structural view showing an embodiment of a burglar-proof system of the present invention.

In the structural view of FIG. 1 showing an embodiment of the present invention, reference numeral 1 denotes a burglar-proof controller; 2 is an alarm siren; 3 is an alarm light; and 4 is a microphone for picking up a glass smashing sound.

The state of a plurality of switches (sensors) 5-8 is inputted to the controller 1. For example, an alarm state is entered by the switches 5 and 6 and is released by the switches 7 and 8. The switches 5 and 6 are a door switch and a feed switch and the switches 7 and 8 are an ACC switch and an IG switch, respectively, for example. This alarm/release state can be remote controlled by a transmitter 11, and reference numeral 10 denotes a reception antenna for this remote control operation.

Figure 2:
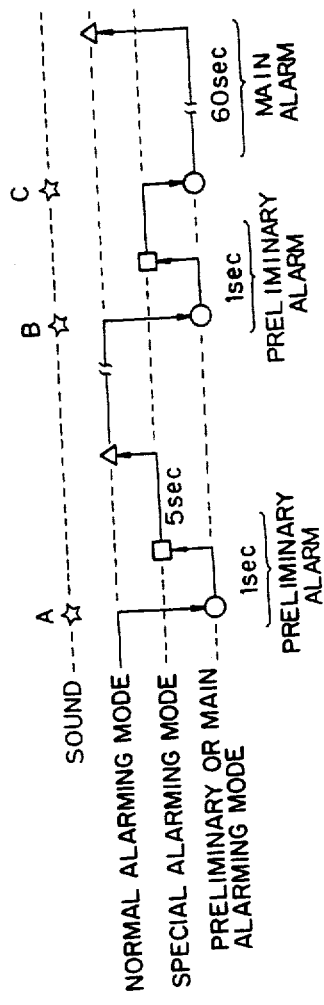
FIG. 2 is a time chart in the present invention.
Figure 3B:
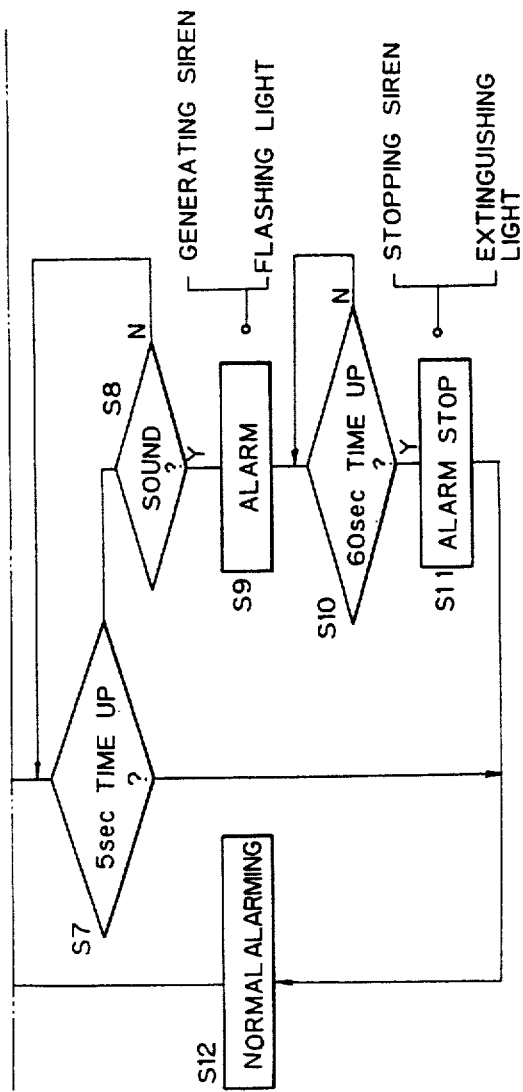

FIG. 2 is a timechart useful for explaining the operation of the present invention. The alarming includes a preliminary alarming for 1 second and a main alarming for 60 seconds.

FIG. 2 shows the case when a glass smashing sound occurs three times, i.e., A, B and C. When the glass smashing sound A occurs during the normal alarming mode, the preliminary alarm is raised and 1 second later, the alarm shifts to the special alarming mode. This special alarming mode is limited to 5 seconds and the mode returns to the normal alarming mode unless a new glass smashing sound occurs within this period. Since no glass smashing sound occurs during the normal alarming mode in this case, the sound A may be a false sound or a burglar may cease smashing the glass.

In contrast, when the glass smashing sound B is detected and the preliminary alarm is raised, the mode shifts to the special alarming mode and the next glass smashing sound C occurs within 5 seconds. Though this state can be considered as the state wherein the main alarm should be raised, the alarming period is limited to 60 seconds in order to prevent draining the battery of power and reduce the influence of erroneous operations. Then, the mode returns to the normal alarming mode.

In other words, the first embodiment of the present invention includes the normal alarming mode when the preliminary alarm is raised for a short time at the time of detection of the glass smashing sound and the special alarming mode when the main alarming is raised for a long time at the time of detection of the glass smashing sound, and is characterized in that the operation mode shifts from the end of the preliminary alarming to the special alarming mode and then returns to the normal alarming mode after a predetermined period of time passes if no glass smashing sound is detected at the end of the main alarming or during the special alarming mode.

Figure 3B:
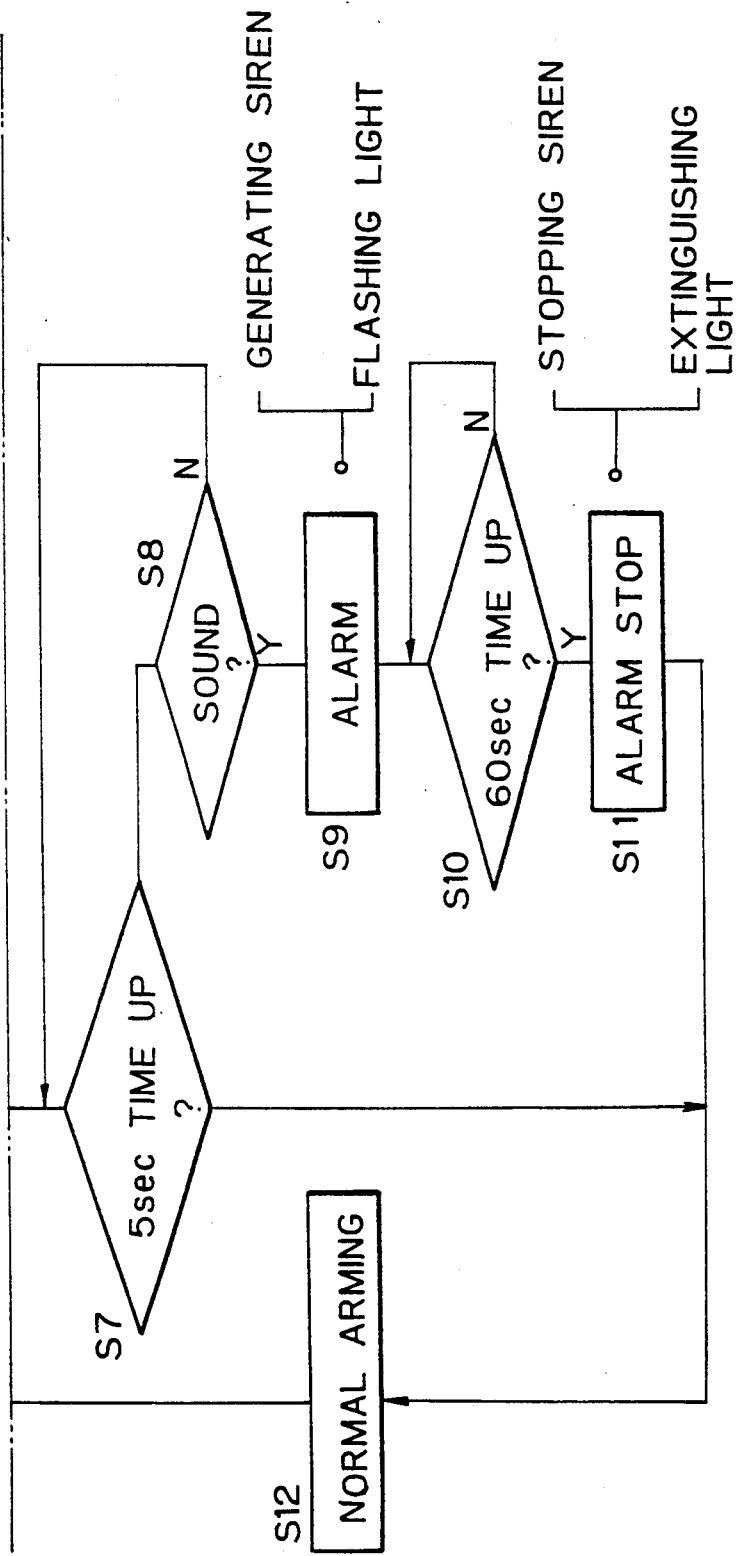

FIGS. 3A and 3B comprise a flowchart of the controller 1 for executing the process described above. This process starts when the operation mode enters the alarming state and waits for the normal alarming at step S1. If Y (yes) is obtained at this step S1, the glass smashing sound (Sound) is detected at the next step S2. The preliminary alarm in the normal alarming mode is limited to 1 second. Therefore, if the glass smashing sound is detected at the step S2, the alarm (Alarm) is raised only for 1 second at the next steps S3 to S5. After the alarm is stopped at the step S5, the operation mode shifts to the special alarming (Special Alarming) at step S6 and this state is limited to 5 seconds at the next step S7. In the mean time, the glass smashing sound is monitored at step S8 and if it is detected, the main alarm is raised for 60 seconds at steps S9 to S11. After step S11 is executed, the mode returns to normal alarming at step S12 and the flow returns again to step S1. This also holds true of the case when 5 seconds passes at step S7.

As described above, the present invention provides the advantage that erroneous operation resulting from erroneous detection of a glass smashing sound can be minimized in the system for raising an alarm by detecting a glass smashing sound.

Next, the second embodiment of the present invention will be explained.

The burglar-proof system for automobiles described above can of course be applied to the detection of intruders into houses and rooms and in such cases, the alarm system is set cognizant of the fact that the door of the said room is locked and not occupied.

However, if the burglar-proof system having an alarming sound detection function, such as the glass smashing sound, is so constituted as to be reset by the ON operation of the key unlock switch (which is instantaneously turned ON when the door of the car is unlocked by the key), there remains the problem that if the key strikes the car body or the glass of the door of the room at the time of the unlocking operation, an erroneous alarm is likely to be raised by the sound at this time.

The second embodiment of the present invention is directed to solve such a problem. When the key strikes the body or the window pane of the car or the door of the room when the burglar-proof system having the alarmed sound detection function, such as the glass smashing sound, is unlocked, the present embodiment prevents the erroneous alarm from being raised by this sound.

Figure 4:
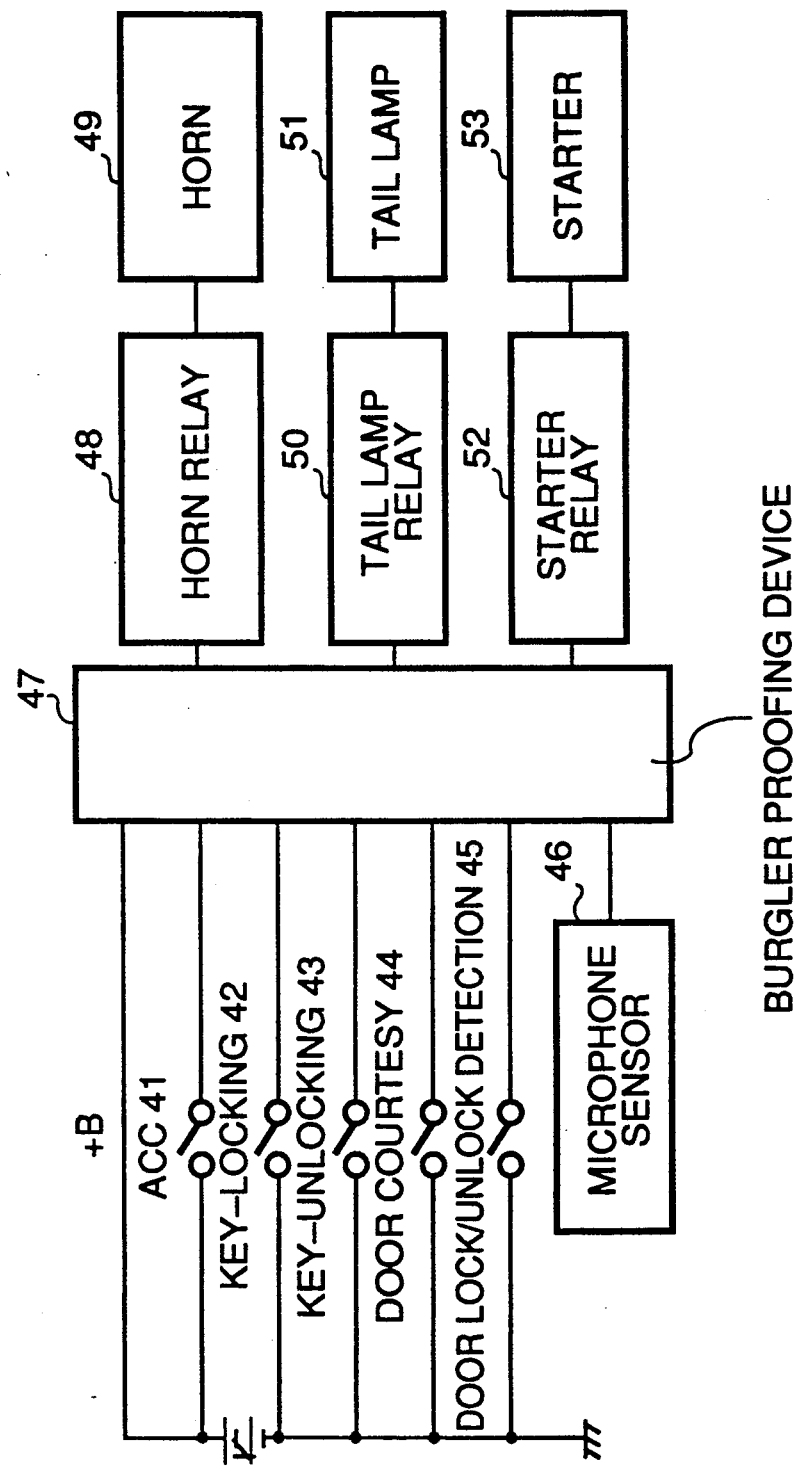
FIG. 4 is a structural view showing another embodiment of a burglar-proof system of the present invention.

FIG. 4 shows an example of the burglar-proof system in accordance with the second embodiment of the present invention. Reference numeral 41 denotes an accessory switch; 42 is a key lock switch that is instantaneously turned ON when the door is locked by the key; 43 is a key unlock switch that is instantaneously turned ON when the door is unlocked by the key as described above; 44 is a door courtesy switch that is turned ON when the door is open; 45 is a detection switch for detecting lock/unlock of the door (which is turned OFF when the door is locked and is turned ON when the door is unlocked); and 46 is a microphone sensor.

Here, the burglar-proofing apparatus 47 is set (security set) when all the doors are closed and are locked by the key lock switch, and is reset (security reset) when any door is unlocked by the key unlock switch or when the accessory switch is turned ON. When the burglar-proof apparatus is set, if the door courtesy switch is turned ON (that is, the door is open), though the door is not unlocked by the key, or if glass smashing is detected by the output from the microphone sensor 46, the alarm is raised (the horn 49 is operated through a horn relay 48 or a tail lamp 51 is turned ON through a tail lamp relay 50, for example), and a starter 53 is turned OFF through a starter relay 52, if necessary.

In other words, the second embodiment of the present invention provides the burglar-proof system for automobiles, including a means for outputting a predetermined alarm when the alarmed sound, such as glass smashing, is detected, and a means for inhibiting this alarm when the key unlock switch is turned ON before the passage of a predetermined time from the detection of this sound.

According to the construction described above, the burglar-proof system is reset without outputting the alarm if the key unlock switch is turned ON within t seconds (e.g. 10 seconds), which is the time from the detection of the alarmed sound to the operation of the key unlock, and outputs the predetermined alarm on the basis of the detection of glass smashing when the key unlock switch is not turned ON within the t seconds by regarding that glass smashing is actually occurring.

Figure 5B:
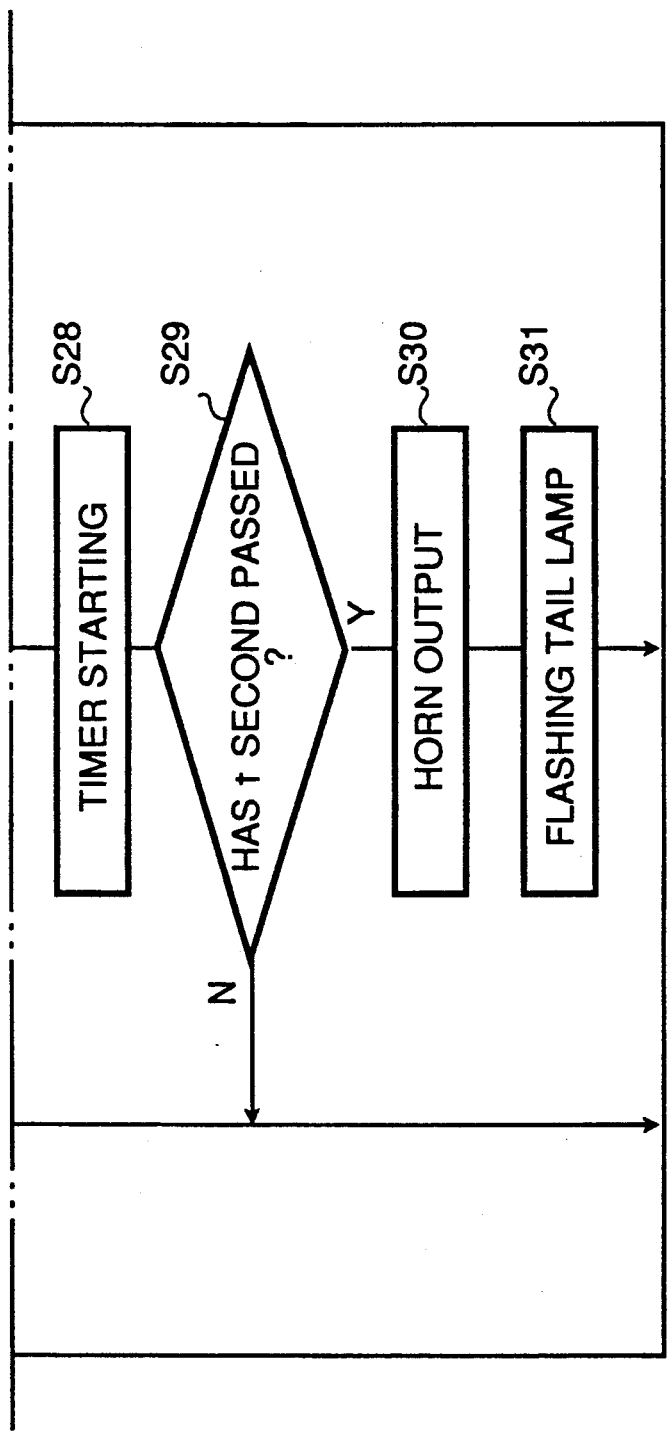

FIGS. 5A and 5B comprise a flowchart of the operation procedure of the burglar-proof system shown in FIG. 4. To begin with, initialization is effected at step S21 and both flag and timer are set to "0", respectively. Next, whether or not the key lock switch is turned ON is determined at step S22. If turned on ("Yes"), the flow proceeds to step S23, at which the security set is effected. The flag is further set to "1" at step S24.

If the key lock switch is not turned on ("No") at step S22, the flow proceeds to step S25, and it is determined whether or not the key unlock switch is turned ON. If "No", the flow proceeds to step S26, and it is determined whether or not the flag is 1 (that is, whether or not the condition is the security set state). If "Yes", the flow proceeds to step S27, and it is determined whether or not the output from the microphone sensor exists. If "Yes", the timer is started at step S28. Next, it is determined whether or not the t second's time (e.g. 10 seconds) has passed in this time.

If the key unlock operation is effected before that t seconds pass in the timer (that is, while the result of step S29 remains "No"), the flow proceeds to step 32 through steps S22 and S25 (at which step S25 proves "Yes"). The flag is then set to "0" and the timer is further reset at step S34.

On the other hand, if the key unlock switch is not turned ON within t seconds from the start of the operation of the timer (that is, if the result proves "Yes" at step S29), the horn is operated at step S30 by being regarded as in the glass smashing state, and the tail lamp is turned ON and OFF repeatedly at step 31.

According to this embodiment, the erroneous detection of glass smashing when the key strikes the body during the resetting operation of the system by the key unlock operation, and the erroneous generation of the alarm due to this erroneous detection can be effectively prevented.

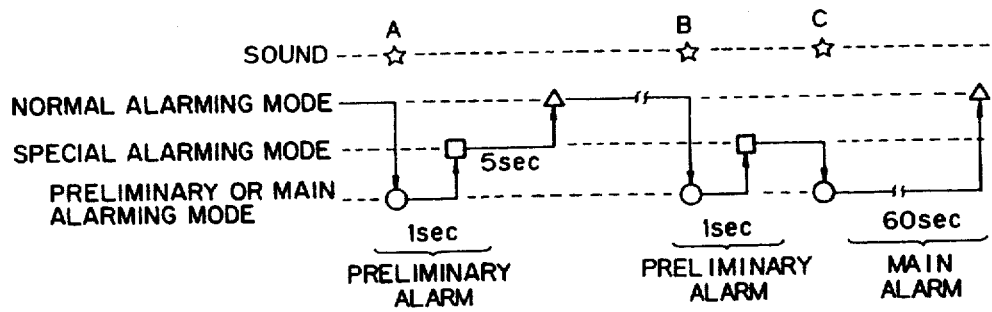

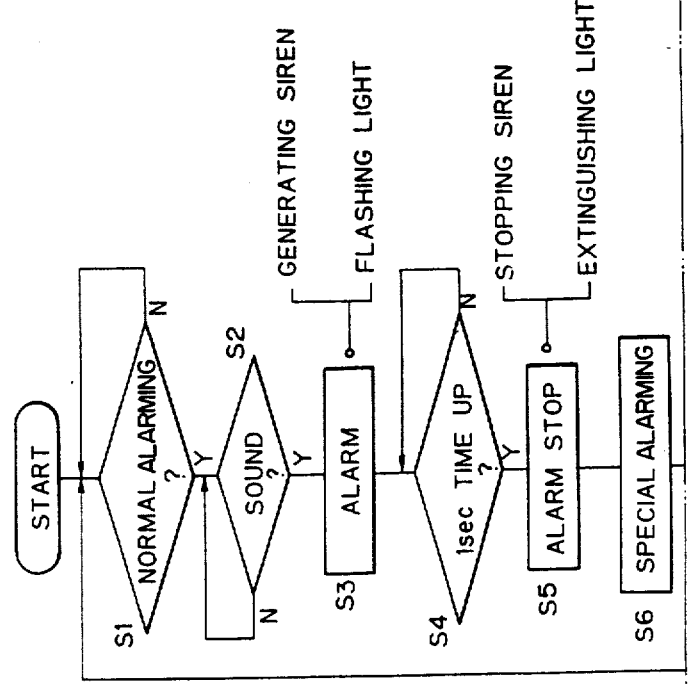

We claim:

1. An alarm system method including a normal alarm mode for generating a preliminary alarm for a short time when an alarming sound is detected and a special alarm mode for generating a main alarm for a long time when a successive alarming sound is detected, said alarm system method comprising the step of performing mode switching in such a manner as to shift the normal alarm mode to a preliminary alarm mode when a first alarming sound is detected, and to shift the preliminary alarm mode to the special alarm mode after a first predetermined time has passed from when the first alarm sound was generated, and then to shift the special alarm mode to the normal alarm mode when the successive alarming sound is not detected for a second predetermined time in the special alarm mode.

2. An alarm system method according to claim 1, wherein said alarming sound is a glass smashing sound.

3. An alarm system method according to claim 2, wherein said alarm system is a burglar-proof system for automobiles.

4. A burglar-proof system for automobiles including means for outputting a predetermined alarm when a sound such as a glass smashing sound is generated, said system comprising means for inhibiting said predetermined alarm when a key unlock switch is turned ON before the passage of a predetermined time from the detection of said sound.

5. An alarm system method according to claim 1, further including preliminary and main alarming modes and an operation mode operating in the preliminary, main, normal and special alarm modes at a specific instance in time, and the alarming sound includes first and second alarm sounds, wherein said alarm system method further comprises the steps of:

generating the preliminary alarm in the normal alarm mode when the first alarm sound is detected, and shifting the operation mode from the normal alarm mode to the preliminary alarm mode;

shifting the operation mode from the preliminary alarm mode to the special alarm mode at the end of the preliminary alarm;

generating the main alarm in the special alarm mode when the second alarm sound is detected within a predetermined time when the operation mode is in the special alarm mode, and shifting the operation mode from the special alarm mode to the main alarm mode; and shifting the operation mode from the special alarm mode to the normal alarm mode when the second alarm sound is not detected within the predetermined time when the operation mode is in the special alarm mode, and not generating the main alarm in the special alarm mode.

* * * * *

UNITED STATES PATENT AND TRADEMARK OFFICE
CERTIFICATE OF CORRECTION

PATENT NO. : 5,172,093

DATED : December 15, 1992

INVENTOR(S) : Nose et al.

It is certified that error appears in the above-identified patent and that said Letters Patent is hereby corrected as shown below:

Title page, item [73] Assignee, before "Japan" insert --Kobe,--.
item [30] Foreign Application Priority Data, change "3-21066[U] to --3-21066--.

Title page, showing the illustrated figure 2, should be deleted and substituted with the attached title page.

Drawing figures 2, 3A and 3B, should be deleted and replaced with the attached figures 2, 3A and 3B.

Col. 1, line 11, change "of an" to --of--.
line 24, change "the said" to --the--.
Col. 2, line 27, change "3B comprises" to --3B comprise--.
line 33, change "5B comprises" to --5B comprise--.

Signed and Sealed this

Second Day of September, 1997

Attest:

BRUCE LEHMAN

Attesting Officer

Commissioner of Patents and Trademarks

United States Patent
Nose et al.

[11] Patent Number: 5,172,093
[45] Date of Patent: Dec. 15, 1992

[54] ALARMING SYSTEM

[75] Inventors: Shinji Nose; Manabu Matsubara, both of Kobe, Japan

[73] Assignee: Fujitsu Ten Limited, Japan

[21] Appl. No.: 796,449

[22] Filed: Nov. 22, 1991

[30] Foreign Application Priority Data

Nov. 22, 1990 [JP] Japan ............... 2-319827
Apr. 2, 1991 [JP] Japan ............... 3-21066[U]

[51] Int. Cl.⁵ ............................. G08B 13/04
[52] U.S. Cl. ....................... 340/426; 340/527; 340/529; 340/430; 340/550
[58] Field of Search .......... 340/426, 429, 566, 571, 340/430, 550, 527, 528, 529, 530

[56] References Cited

U.S. PATENT DOCUMENTS

| | | | |
|---|---|---|---|
| 4,030,087 | 6/1977 | Ritchie et al. | 340/571 |
| 5,084,697 | 1/1992 | Hwang | 340/529 |

FOREIGN PATENT DOCUMENTS

| | | |
|---|---|---|
| 61-14158 | 1/1986 | Japan. |
| 61-78065 | 5/1986 | Japan. |
| 61-150852 | 7/1986 | Japan. |
| 61-161477 | 7/1986 | Japan. |
| 61-171641 | 8/1986 | Japan. |
| 61-163767 | 10/1986 | Japan. |
| 62-46741 | 2/1987 | Japan. |
| 62-114853 | 7/1987 | Japan. |
| 62-143557 | 9/1987 | Japan. |
| 62-247945 | 10/1987 | Japan. |
| 62-189272 | 12/1987 | Japan. |
| 63-125458 | 5/1988 | Japan. |
| 63-129655 | 8/1988 | Japan. |
| 63-269757 | 11/1988 | Japan. |
| 64-16954 | 1/1989 | Japan. |
| 1-237900 | 9/1989 | Japan. |
| 2-41856 | 3/1990 | Japan. |
| 2-107550 | 8/1990 | Japan. |
| 2-132561 | 11/1990 | Japan. |

Primary Examiner—Glen R. Swann, III
Attorney, Agent, or Firm—Staas & Halsey

[57] ABSTRACT

In a glass smashing alarm system for generating an alarm when a glass smashing sound is detected, the present invention is directed to reduce the possibility of occurrence of an erroneous alarm, and includes a normal alarm mode in which a preliminary alarm is raised for a short time when a glass smashing sound is detected, and a special alarm mode in which a main alarm is raised for a long time when the glass smashing sound is detected, and is constituted in such a manner that mode switching is effected so as to shift the mode to the special alarm mode at the end of the preliminary alarm, and to return it to the normal alarm mode after the passage of a predetermined time if the glass smashing sound is not detected at the end of the main alarm or during the special alarming mode. In another aspect of the invention, generation of an alarm is inhibited if a key unlock switch is turned ON before passage of a predetermined time from detection of the glass smashing sound.

5 Claims, 7 Drawing Sheets